Figure 3:
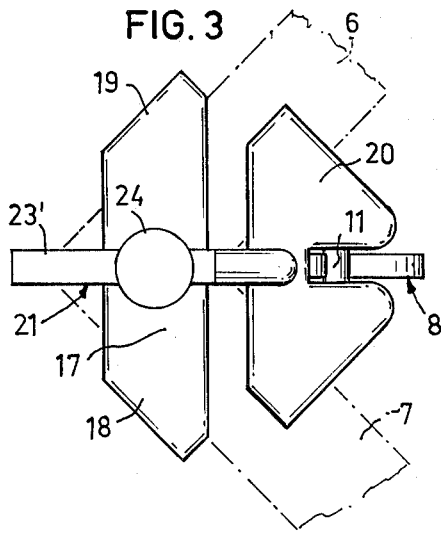

United States Patent [19]

Curlow

[11] 4,033,570
[45] July 5, 1977

[54] CORNER CLAMP

[75] Inventor: Rolf Lennart Curlow, Gustavsberg, Sweden

[73] Assignee: AB Gustavsbergs Fabriker, Gustavsberg, Sweden

[22] Filed: Apr. 8, 1976

[21] Appl. No.: 675,161

[30] Foreign Application Priority Data

Apr. 17, 1975 Sweden .............................. 7504443

[52] U.S. Cl. .................................. 269/41; 403/402; 403/405; 403/231; 52/657
[51] Int. Cl.² ........................................... B25B 1/20
[58] Field of Search .... 403/231, 167, 49, 170–172, 403/176, 373, 374, 361, 403, 401, 405, 409, 402; 52/753 C, 753 D, 280, 288, 657; 24/263 B, 263 LL; 269/104, 110, 112, 116, 117, 124, 125, 153, 154, 155, 230, 233, 236, 217, 218, 40, 41, 42

[56] References Cited

UNITED STATES PATENTS

| 394,793 | 12/1888 | Stoecklin | 269/196 |
| 744,555 | 11/1903 | Jacobs | 269/112 |
| 2,417,144 | 3/1947 | Trimble | 269/116 X |
| 2,660,141 | 11/1953 | Thomas | 269/41 X |
| 2,761,476 | 9/1956 | Gunas | 269/112 X |
| 3,080,162 | 3/1963 | Smith | 269/42 X |
| 3,944,200 | 3/1976 | Huntley | 269/42 |

Primary Examiner—Wayne L. Shedd
Attorney, Agent, or Firm—Pierce, Scheffler & Parker

[57] ABSTRACT

A device for cornerwise interlocking or clamping together elements, said device comprising a base plate mounting two abutments upstanding from said plate, and a supporting means parallel with said abutments, there being movably mounted on said supporting means an angular pressure plate and pivoted upon a transverse pin in a slot in the supporting means an excentric having a lever, said excentric applying when swung to a clamping position a pressure on the pressure plate for the movement of same towards the abutments.

5 Claims, 6 Drawing Figures

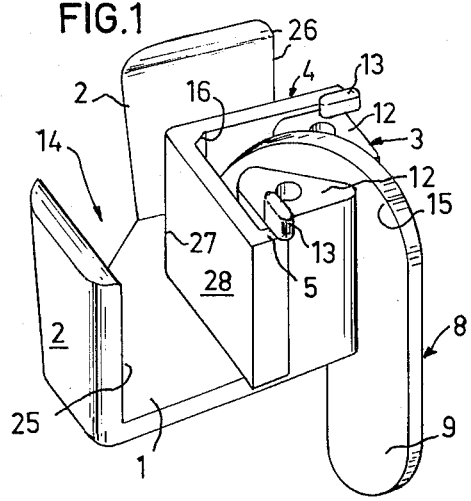
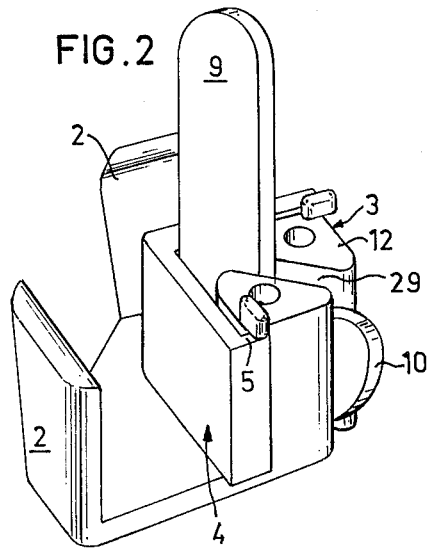
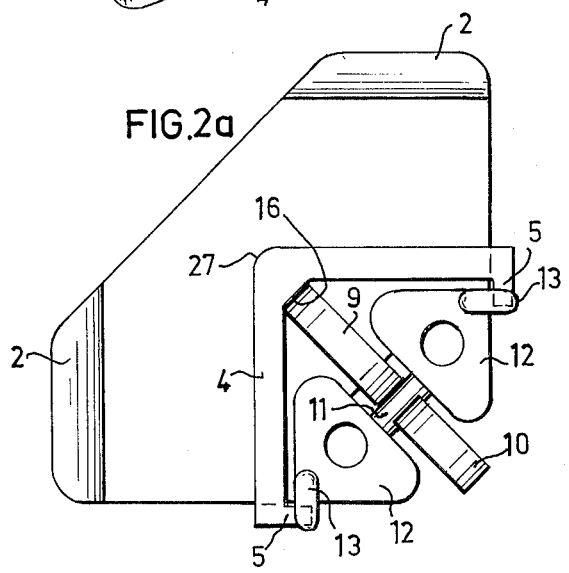

CORNER CLAMP

The present invention relates to a clamping device for such mutual fixing of constructional elements arranged as an angle to each other, which are each substantially uniformly thick, at least the actual fixing area, that a corner is formed between the elements, which device comprises a base portion provided with at least two rigid, mutually separated abutments, and a supporting means joined to the base portion, on said supporting means there being accommodated an angular pressure plate with a certain amount of freedom of movement, there also being attached to the supporting means a pressure applying means by means of which the pressure plate can be moved towards the abutments into a clamping position in which the constructional elements inserted between the abutments and pressure plate are cornerwise fixed adjacent each other.

The subject of patent is primarily intended to be used as a quick-locking corner clamp for keeping together sheets, boards, laths, bars and the like. An example of the use of the device is in the temporary connection of chipboard or similar elements for constructing shelves and the like.

In building up and putting together exhibition shelves and similar presentation arrangements made from sheet material, such as chipboard, plate glass and the like, it is usual to use some kind of corner connecting means, e.g. some kind of corner cramp. Such corner connecting means must however be suited to the board thickness and the corner configuration in question. The term "corner configuration" is to be regarded here as including all normal types of corner, e.g. L-corners (simple corners), T-corners and X-formed cross-corners (intersections). The corner connecting means are generally made from profiled material and designed for some special corner shape in question, and they are often lined with a yielding material so that the connecting means can be used for joining together board material having a certain variation in thickness. Assembly often takes place by the respective connecting means being driven on to the edge of the board in a suitable way. When it is desired to disassemble a structure connected together in this way, a comparatively large force is required, which is often difficult to apply to the generally thin edges and smooth sides of the connecting means.

In workshop practice, corner clamps of different types are already known. One such known type consists of two abutments at an angle to each other, against which a pressure plate can be moved by means of a screw. This type of clamp is however much too clumsy and inconvenient for consideration when, for example, a temporary structure of shelves for window-dressing or exhibitional purposes is required.

The object of the present invention is to provide a new type of fixing device with which sheets, boards, bars and laths can be located cornerwise adjacent each other. It should be possible to put together the fixing device from a small number of parts which can be put together without special tools, and the locking operation for it should not need a tool, i.e. locking should only require the bare hand. Furthermore, the fixing device should be suitable for mass production in plastics, for example. The abutments on the base portion should be arranged at such a mutual distance that at least one of the constructional elements which is to be clamped can extend outwardly between the abutments to enable T-corners and intersecting corners (X-corners).

According to the invention, said object can be accomplished by the fixing device accounted for in the introduction being distinguished by the pressure plate pressure applying means comprising an excenter pivotably mounted in the supporting means and provided with a lever or the like.

Different preferred embodiments of the fixing device according to the invention are apparent from the subordinate claims 2–5.

In one of the preferred embodiments, the base portion constitutes a base plate, upstanding from which there are the abutments, formed as walls, and the slotted supporting means. A transverse pin is provided across the slot for the excenter swingable in the slot, and on the supporting means and/or the pressure plate there are means for keeping the pressure plate to the supporting means. These means can, for instance, have the shape of edge flanges at the free edges of the pressure plate, or consist of projections at the free end of the supporting means. The excenter with its lever can suitably have the form of a J-shaped plate which is snapped onto the pin.

Instead of being made integrally on a common base plate, the abutments and the supporting means can be connected to each other by means of a pivotable arm. To advantage in this case, one end of the arm is provided with a pin projecting from it which is pivotably mounted in a base on the supporting means, while the other end of the arm is provided with an engaging portion having a friction-developing surface structure. This portion of the arm is taken through an aperture in a plug pivotably mounted in the plate-shaped base portion. The distance between the supporting means and the pressure plate may hereby be locked by the arm, when it begins to come at an angle in the aperture in the plug as a result of the pressure of the excenter against the pressure plate, being locked in the aperture, due primarily to the engagement which occurs between the mouth of the aperture and the friction-generating engagement portion of the arm. The arm may alternatively be threaded and screwed into a threaded hole in the plug.

As already mentioned, the excenter is preferably plate-shaped and made integrally with the lever, whereby it is given the approximate shape of a J. The pressure plate suitably has in cross section the shape of a V or L. The root or bottom portion of the channel-like angular section thus formed serves as the pressure surface against which an edge portion of the excenter is pressed by swinging the excenter lever.

It can be advantageous to manufacture the device in plastics, particularly when the base plate, abutments and supporting means are made in one piece. In such a case, the pressure plate is also made to advantage in plastics, and its free edges may be provided with flanges forming the means wherewith it is kept to the supporting means.

The invention will now be described in detail while referring to some preferred embodiments shown on the appended drawing.

Figure 4:
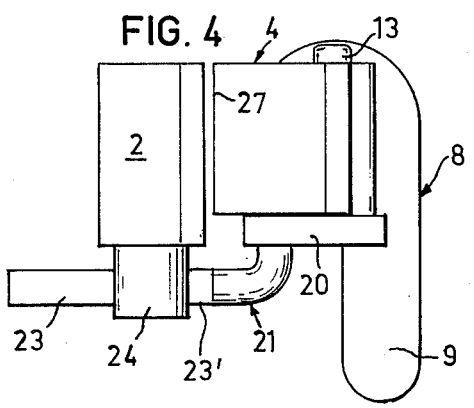
Figure 5:
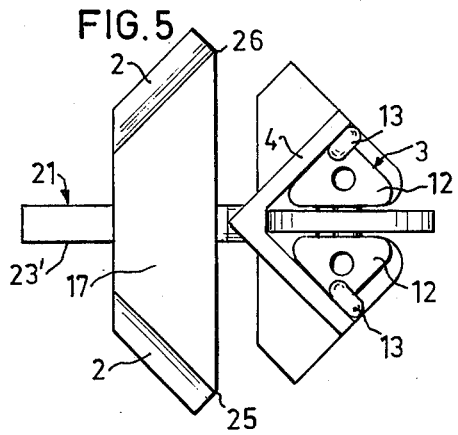

On the drawing,

FIG. 1 shows in perspective a first embodiment of the fixing device according to the invention, the device being shown in an open position;

in FIG. 2 the device according to FIG. 1 is shown in a clamping position, i.e. with the excenter swung into its clamping position;

in FIG. 2a the device according to FIG. 2 is shown (in larger scale) in plan view as seen from top;

in FIG. 3 there is shown (in a bottom view) a second embodiment of the device according to the invention, as it can appear from below when it is placed over the corner formed by two constructional elements of different thicknesses clamped to form an L; and FIGS. 4 and 5 show a side view and top view, respectively, of the device shown in FIG. 3.

In FIGS. 1 and 2 a preferred embodiment of the inventive subject is shown in an open and clamped position respectively. In order to make the figures more clear, the constructional elements which are intended to be joined together with the fixing device have not been shown in these figures.

The device in FIGS. 1 and 2 has a base plate 1 constituting the base portion on which two rigid, mutually angularly disposed abutments 2 of the device are arranged. The base plate 1 also carries a slotted, supporting means 3 upstanding from it and having side faces parallel with the abutments 2. A pressure plate 4 which is formed as a V-shaped or angular plate is accommodated with a certain amount of freedom of movement on the supporting means. The pressure plate 4 is kept in place along the outer faces of the supporting means by the plate having its free edges provided with inwardly directed edge flanges 5 enabling the pressure plate to be snapped on to the supporting means 3. As will be seen from FIGS. 1 and 2, both planar pressure surfaces 28 of the pressure plate 4 each face one of the upstanding abutments 2. The constructional elements (designated 6 and 7 in FIG. 3) which are to be clamped to each other with the help of the fixing device, are intended to have uniformly thick portions inserted in the gaps (which are rectangular in cross section) between the abutments 2 and the surfaces 28. The supporting means 3, which is divided into one part and a part to opposite hand by the slot 29, also carries the pressure applying means 8 of the device, taking the form of an excentric 10 provided with a lever 9. The pressure applying means 8 is pivotably mounted on a pin 11, going transversely through the slot 29. In the clamping position, the pressure plate is kept pressed by the edge portion of the excentric with the greatest distance from the pin 11 against the two constructional elements which are clamped by means of the device. The working edge portion of the excentric is pressed in the clamping position (the applied position) against the root channel of the angular plate constituting the pressure plate 4.

At the upper ends of both halves 12 of the supporting means 3 there are provided outwardly directed shoulders 13 preventing the pressure plate 4 from gliding away from the supporting means 3 in its longitudinal direction.

Between the abutments 2 upstanding from the base plate 1 and parallel with the supporting means 3 there is a space 14 through which either of the interconnected constructional elements can extend. The constructional elements in question are clamped together by the excentric 10 being swung on the pin 11 so that the back portion 15 of the excentric will be pressed against the root 16 of the angular channel at the rear side of the pressure plate 4. As a result of the pressure exerted by the excentric the pressure plate 4 is moved towards the abutments 2 and thereby towards the appropriate constructional elements. In the applied or clamped position (see FIG. 2) the surfaces 28 of the pressure plate keep the constructional elements pressed against the respective abutment 2. In this way the desired mutual corner fixing of the constructional elements is obtained. When it is desired to release the constructional elements clamped together by the fixing device, the pressure applying means 8 is swung by force of hand on the lever 9 from the clamping position (FIG. 2) towards the open position (FIG. 1). This enables the pressure plate 4 to move backwards from engagement with the surfaces of the constructional elements, whereafter the fixing device can be removed from them.

By reason of the space 14 between the abutments 2, the fixing device may also be used for clamping boards in a cross-corner (intersection) whereon two fixing devices are applied in alternate sectors at the corner.

As will be realized from the general portion of the description, the fixing device according to the invention can also be given a design suiting it for use in connecting sheets or boards of different thicknesses. In FIG. 3 there is shown an embodiment of the inventive subject when it is designed for clamping together two constructional elements 6 and 7 having different thicknesses at the clamping location. The figure shows the device as seen from below, in its not applied position.

In this case the base portion provided with the abutments 2 is given the shape of a plate 17, from the edge portions 18 and 19 of which the abutments 2 project out from the side concealed in FIG. 3. The supporting means 3, or more closely, a base portion 20 of the supporting means, is connected to the plate 17 by means of an arm 21. The right-hand end in FIG. 3 of the arm 21 has an angled pin portion 22 (see FIG. 4) which is turnably mounted in a hole in the base portion 20. The other end of the arm 21, the left-hand end in FIGS. 3–5, has an engagement portion 23 provided with a friction generating surface structure 23' (e.g. a knurled, grooved or fluted surface structure). The portion 23 is taken through an aperture in a plug 24 turnably mounted in the plate 17. If, for example, the arm 21 has a rectangular cross section, then the aperture in the plug 24 is also rectangular, although somewhat larger in cross section than the arm 21.

When the pressure applying means 8 is swung into its clamping position in this case, the pressure plate 4 (shown in FIGS. 4 and 5) is pressed against the angle between the elements 6 and 7, clamping tension thereby arising in the arm 21. In this way a certain slanting attitude of the engaging portion 23 of the arm 21 in the aperture through the plug 24 is achieved, having the result that locking engagement occurs between the edges of the mouth of the aperture and the engagement portion 23.

When the two construction elements 6 and 7, which may have different thicknesses, are to be clamped to each other, the fixing device according to FIGS. 3–5 is fitted over the corner in the same way as when applying the device according to FIGS. 1 and 2. The abutments 2 of the plate 17 are thereby pressed against the outer corner, and the angular pressure plate 4 (see FIG. 5) of the supporting means 3 formed integrally with the base portion 20 is adjusted to the inner (inside) corner between the elements 6 and 7. The arm 21 is hereby pushed through the aperture in the plug 24 turnably mounted in the plate 17, until the greatest possible length of the engagement portion 23 projects out on the outside of the plug 24. The elements 6 and 7 are thereon clamped relatively to each other by the lever 9 of the excenter 10 being swung to the clamping position, whereon the excenter 10 presses the pressure plate 4, in the same way as with the embodiment according to FIGS. 1 and 2, against the inner corner of the elements 6 and 7, thereby completing the clamping action.

The abutments 2 on the plate 17 as well as the whole of the supporting means, pressure applying means 8 and the pressure plate 4 can have the same structural design in the embodiment according to FIGS. 3-5 as in the embodiment according to FIGS. 1 and 2. The fixing device according to FIGS. 3-5 can be regarded as formed by a device according to FIGS. 1 and 2, with somewhat narrower abutments 2 than in the latter figures, being divided into two parts by means of a cut between the edges 25 and 26 through the base plate 1. The embodiment is hereby assumed to be such that the front edge 27 of the pressure plate 4 comes to lie immediately to the right of said cut (seen in FIGS. 1 and 2). The direct connection (according to FIGS. 1-2) between the abutments 2 and the supporting means 3, in the "parted" embodiment according to FIG. 3, is replaced by the articulated joint which is brought about by means of the arm 21. Instead of having a rectangular cross section, the arm 21 may for example have a circular cross section, and the friction generating surface structure 23' may consist of a threading. To enhance the engagement between such a threading and the aperture in the plug 24, the aperture may have the form of a cylindrical hole having internal threads mating with the threading on the arm 21.

The embodiments of the fixing device according to the present invention accounted for above are only to be regarded as two of the different possible embodiments lying within the scope of the invention as it is defined in the main claim. A plurality of other embodiments are naturally conceivable within the scope of the invention as defined in the patent claims.

What I claim is:

1. In a clamping device for such mutual fixing of constructional elements arranged at an angle to each other, each of which are substantially uniformly thick at least at the fixing area in question, so that a corner is formed between the elements.

which device comprises a base portion provided with at least two rigid, spaced abutments, a supporting means joined to the base portion, on said supporting means there being accommodated an angular pressure plate with a certain amount of freedom of movement, there also being movably attached to the supporting means a pressure-applying means by which the pressure plate can be moved towards the abutments into a clamping position in which the constructional elements inserted between the abutments and the pressure plate are cornerwise fixed adjacent each other, the improved construction according to which the base portion comprises an abutment plate, the aforesaid abutments being formed integrally with this abutment plate and having the form of two projections extending upwardly from it and arranged at an angle to each other, the supporting means being connected to the abutment plate by means of an arm one end of which arm has a pin portion projecting from it, which pin portion is turnably mounted in a base portion of the supporting means and the other end of which arm has an engagement portion with a knurled surface structure, said knurled engagement portion extending through an aperture in a plug turnably mounted in the abutment plate, the arm being adapted to be held stationary in the aperture, when there is a certain angular displacement thereof, by engagement between the opening edges of the aperture and engagement portion of the arm.

2. A clamping device as defined in claim 1, wherein the supporting means has a slot in which the pressure-applying means is pivotably accommodated and journalled on a pin, there also being arranged means on at least one of the supporting means and pressure plate for snapping the pressure plate onto the supporting means.

3. A clamping device as claimed in claim 2, wherein the pressure-applying means comprises a plate made integrally with a lever, and wherein the angular pressure plate is a plate having a V-shape in cross-section, the bottom of which pressure plate forms a pressure surface against which an edge portion of the pressure-applying means is adapted to be pressed when the pressure plate is in its clamping position.

4. A clamping device as claimed in claim 3, in which the pressure-applying means comprises an eccentric member being rotatably journalled to the supporting means, which eccentric member is provided with an operating portion in the form of a lever for operating said eccentric member.

5. A clamping device as claimed in claim 4, wherein the free edges of the angular sidewalls of the pressure plate are provided with longitudinal flanges for retaining the pressure plate on the supporting means.

* * * * *